(12) United States Patent
Kowalski et al.

(10) Patent No.: US 7,922,805 B2
(45) Date of Patent: Apr. 12, 2011

(54) METHOD OF PREPARING OXIDIZED MODIFIED PIGMENTS AND INKJET INK COMPOSITIONS COMPRISING THE SAME

(75) Inventors: Mark H. Kowalski, Albuquerque, NM (US); Feng Gu, Westford, MA (US)

(73) Assignee: Cabot Corporation, Boston, MA (US)

( * ) Notice: Subject to any disclaimer, the term of this patent is extended or adjusted under 35 U.S.C. 154(b) by 939 days.

(21) Appl. No.: 11/305,614

(22) Filed: Dec. 16, 2005

(65) Prior Publication Data

US 2006/0201380 A1    Sep. 14, 2006

Related U.S. Application Data

(60) Provisional application No. 60/637,374, filed on Dec. 17, 2004.

(51) Int. Cl.
*C09D 11/00* (2006.01)
*C09C 1/44* (2006.01)

(52) U.S. Cl. ...................................... 106/478; 106/31.6
(58) Field of Classification Search .................. 106/478, 106/31.6
See application file for complete search history.

(56) References Cited

U.S. PATENT DOCUMENTS

| | | | |
|---|---|---|---|
| 3,216,843 A | 11/1965 | Heller et al. | |
| 3,245,820 A | 4/1966 | Mclore | |
| 3,364,048 A | 1/1968 | May et al. | |
| 3,495,999 A | 2/1970 | Hagopian | |
| 5,395,435 A | 3/1995 | Mizobuchi | |
| 5,554,739 A | 9/1996 | Belmont | |
| 5,571,311 A | 11/1996 | Belmont et al. | |
| 5,609,671 A | 3/1997 | Nagasawa | |
| 5,630,868 A | 5/1997 | Belmont et al. | |
| 5,672,198 A | 9/1997 | Belmont | |
| 5,707,432 A | 1/1998 | Adams et al. | |
| 5,718,746 A | 2/1998 | Nagasawa et al. | |
| 5,803,959 A | 9/1998 | Johnson et al. | |
| 5,837,045 A | 11/1998 | Johnson et al. | |
| 5,851,280 A | 12/1998 | Belmont et al. | |
| 5,885,335 A | 3/1999 | Adams et al. | |
| 5,922,118 A * | 7/1999 | Johnson et al. | 106/31.6 |
| 5,964,935 A | 10/1999 | Chen et al. | |
| 5,976,233 A | 11/1999 | Osumi et al. | |
| 6,042,643 A | 3/2000 | Belmont et al. | |
| 6,123,759 A | 9/2000 | Mise et al. | |
| 6,136,286 A | 10/2000 | Okuyama et al. | |
| 6,221,143 B1 | 4/2001 | Palumbo | |
| 6,287,374 B1 | 9/2001 | Yanagida et al. | |
| 6,398,858 B1 | 6/2002 | Yu et al. | |
| 6,402,825 B1 | 6/2002 | Sun | |
| 6,454,846 B2 * | 9/2002 | Yatake | 106/31.58 |
| 6,471,763 B1 | 10/2002 | Karl | |
| 6,471,933 B1 | 10/2002 | Dotson | |
| 6,488,753 B1 | 12/2002 | Ito et al. | |
| 6,494,943 B1 | 12/2002 | Yu et al. | |
| 6,503,311 B1 | 1/2003 | Karl et al. | |
| 6,506,245 B1 | 1/2003 | Kinney et al. | |
| 6,638,350 B2 * | 10/2003 | Butler et al. | 106/31.28 |
| 6,709,507 B2 | 3/2004 | Yeh et al. | |
| 6,723,161 B2 | 4/2004 | Langenmayr et al. | |
| 6,787,029 B2 * | 9/2004 | Gaudet et al. | 210/198.2 |
| 6,852,156 B2 * | 2/2005 | Yeh et al. | 106/31.6 |
| 6,863,719 B2 | 3/2005 | Butler et al. | |
| 2007/0277699 A1 | 12/2007 | Bauer et al. | |

FOREIGN PATENT DOCUMENTS

| | | |
|---|---|---|
| WO | WO 01/94476 | 12/2001 |
| WO | WO 2008/055244 | 5/2008 |
| WO | WO 2008/055245 | 5/2008 |

OTHER PUBLICATIONS

Database WPI Section Ch, Week 199142 Derwnt Publications, Ltd., London, GB; AN 1991-308239 XP002380559 & SU 1 604 819A (Berdnekov M P) Nov. 7, 1990.
JP2000017187 to Mitsubishi Chemicals Corp. (Jan. 18, 2000)—Abstract only.
JP2000017188 toMitsubishi Chemicals Corp. (Jan. 18, 2000)—Abstract only.
JP2000017191 to Mitsubishi Chemicals Corp. (Jan. 18, 2000)—Abstract only.
JP2000017192 to Mitsubishi Chemicals Corp. (Jan. 18, 2000)—Abstract only.
JP2000017193 to Mitsubishi Chemicals Corp. (Apr. 4, 2000)—Abstract only.
JP2000095965 toTokai Carbon KK (Feb. 13, 2001)—Abstract only.
JP2001040240 to Mitsubishi Chemicals Corp. (Jul. 18, 2003)—Abstract only.
JP2003201419 to Dainippon Ink & Chemicals (May 28, 1991)—Abstract only.
JP03124772 to Nippon Steel Chemical Co., Ltd. (Jun. 23, 1998)—Abstract only.
JP10168336 to Mitsubishi Chemicals Corp. (Aug. 11, 1998)—Abstract only.
JP10212425 to Mitsubishi Chemicals Corp. (Jun. 2, 1999)—Abstract only.
JP11148027 to Tokai Carbon KK (Jun. 22, 1999)—Abstract only.
JP11166131 to Mitsubishi Chemicals Corp. (Nov. 26, 1999)—Abstract only.
JP11323175 to Tokai Carbon KK (Dec. 21, 1999)—Abstract only.
JP11349309 to Mitsubishi Chemicals Corp. (Dec. 21, 1999)—Abstract only.
JP11349314 to Mitsubishi Chemicals Corp. (Dec. 21, 1999)—Abstract only.
JP47034819 to Nittetsu Chemical Industries, Inc. (Nov. 22, 1972)—Abstract only.
JP49011998 to Mitsubishi Chemical Industries Co., Ltd. (Mar. 20, 1974)—Abstract only.
JP51076191 to Nittetsu Chemical Industrial Co., Ltd. (Jul. 1, 1976)—Abstract only.

\* cited by examiner

*Primary Examiner* — Jerry Lorengo
*Assistant Examiner* — Veronica Faison Gee

(57) ABSTRACT

The present invention relates to oxidized modified pigments and dispersions as well as methods of preparing them. Also disclosed are aqueous inkjet ink compositions comprising oxidized modified pigments.

16 Claims, No Drawings

METHOD OF PREPARING OXIDIZED MODIFIED PIGMENTS AND INKJET INK COMPOSITIONS COMPRISING THE SAME

CROSS REFERENCE TO RELATED APPLICATIONS

This patent application claims the benefit of U.S. Provisional Patent Application No. 60/637,374, filed Dec. 17, 2004.

BACKGROUND OF THE INVENTION

1. Field of the Invention

The present invention relates to methods of preparing pigments which can be used in compositions including inkjet inks.

2. Description of the Related Art

In general, pigments alone are not readily dispersible in liquid vehicles. A variety of techniques have been developed which can provide stable pigment dispersions. For example, dispersants can be added to the pigment to improve its dispersibility in a particular medium. Examples of dispersants for an aqueous medium include water-soluble polymers and surfactants.

The surface of pigments contain a variety of different functional groups, and the types of groups present depend on the specific class of pigment. Methods have been developed in which materials, in particular, polymers, are grafted to a pigment utilizing the functional groups present on the surface. For example, it has been shown that polymers can be attached to carbon blacks containing surface groups such as phenols and carboxyl groups. However, methods which rely on the inherent functionality of a pigment's surface cannot be applied generally because not all pigments have the same specific functional groups.

Furthermore, several methods have been developed for modifying the types or amounts of surface functional groups of pigments in order to improve performance, including dispersibility. For example, pigments, such as carbon black, have been reacted with oxidants including ozone and nitric acid. The resulting pigments have been found to have a higher degree of oxygen-containing groups on the surface, which has been shown to improve dispersibility in aqueous medium such as water. Other surface modification methods, such as chlorination and sulfonylation are also known.

A method of preparing modified colored pigments have also been developed which provide ink compositions with improved properties, such as dispersibility. For example, U.S. Pat. No. 5,851,280 discloses methods for the attachment of organic groups onto pigments including, for example, attachment via a diazonium reaction wherein the organic group is part of the diazonium salt. The resulting surface-modified pigments can be used in a variety of applications, such as inks, inkjet inks, coatings, toners, plastics, rubbers, and the like.

PCT International Publication No. WO 01/51566 describes a method of making a modified pigment by reacting a first chemical group and a second chemical group to form a pigment having attached a third chemical group. The first chemical group includes at least one nucleophile and the second chemical group includes at least one electrophile, or vice versa. These pigments are used in ink compositions and, in particular, inkjet ink compositions.

While these methods provide modified pigments having attached groups, there remains a need for improved processes for preparing pigments which have improved properties, including dispersibility. These additional methods may provide advantageous alternatives to forming modified pigments and may produce compositions, such as inkjet inks, with improved overall performance.

SUMMARY OF THE INVENTION

The present invention relates to a method of preparing an oxidized modified pigment. The method comprises the steps of: a) forming an aqueous modified pigment dispersion comprising a modified pigment, wherein the modified pigment comprises a pigment having attached at least one organic group, and wherein the organic group comprises at least one ionic group, at least one ionizable group, or mixtures thereof, and b) treating the aqueous modified pigment dispersion with at least one oxidizing agent to form the oxidized modified pigment. The method may further comprise the step of adding a base either prior to, during, or after the oxidation step in order to obtain an aqueous oxidized modified pigment dispersion.

The present invention further relates to an oxidized modified pigment comprising the reaction product of a modified pigment comprising a pigment having attached at least one organic group, wherein the organic group comprises at least one ionic group, at least one ionizable group, or mixtures thereof and b) an oxidizing agent. Preferably the modified pigment is in the form of an aqueous dispersion. The present invention further relates to an aqueous inkjet ink composition comprising the oxidized modified pigment described herein.

It is to be understood that both the foregoing general description and the following detailed description are exemplary and explanatory only and are intended to provide further explanation of the present invention, as claimed.

DETAILED DESCRIPTION OF THE INVENTION

The present invention relates to a method of preparing pigments and the use of the resulting pigments in aqueous inkjet ink compositions.

The method of the present invention is a method of preparing an oxidized modified pigment comprising the steps of forming an aqueous modified pigment dispersion comprising a modified pigment, and subsequently treating this dispersion with an oxidant. The aqueous dispersion comprises an aqueous vehicle, which can be any vehicle that contains greater than 50% water. For example, the aqueous vehicle can be water or mixtures of water with water miscible solvents such as alcohols.

The modified pigment of the aqueous modified pigment dispersion comprises a pigment having attached at least one organic group which comprises at least one ionic group, at least one ionizable group, or mixtures thereof. The pigment can be any type of pigment conventionally used by those skilled in the art, such as black pigments and other colored pigments including blue, black, brown, cyan, green, white, violet, magenta, red, orange, or yellow pigments. Mixtures of different pigments can also be used. Representative examples of black pigments include various carbon blacks (Pigment Black 7) such as channel blacks, furnace blacks and lamp blacks, and include, for example, carbon blacks sold under the Regal®, Black Pearls®, Elftex®, Monarch®, Mogul®, and Vulcan® trademarks available from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® L, Elftex® 8, Monarch® 1400, Monarch® 1300, Monarch® 1100, Monarch® 1000, Monarch® 900, Monarch® 880, Monarch® 800, Monarch®

700, Mogul® L, Regal® 330, Regal® 400, Vulcan® P). Suitable classes of colored pigments include, for example, anthraquinones, phthalocyanine blues, phthalocyanine greens, diazos, monoazos, pyranthrones, perylenes, heterocyclic yellows, quinacridones, and (thio)indigoids. Such pigments are commercially available in either powder or press cake form from a number of sources including, BASF Corporation, Engelhard Corporation and Sun Chemical Corporation. Examples of other suitable colored pigments are described in the Colour Index, 3rd edition (The Society of Dyers and Colourists, 1982). Preferably the pigment is carbon black.

The pigment can have a wide range of BET surface areas, as measured by nitrogen adsorption, depending on the desired properties of the pigment. As known to those skilled in the art, a higher the surface area will correspond to smaller particle size. If a higher surface area is not readily available for the desired application, it is also well recognized by those skilled in the art that the pigment may be subjected to conventional size reduction or comminution techniques, such as ball or jet milling, to reduce the pigment to a smaller particle size, if desired.

The modified pigment of the aqueous modified pigment dispersion comprises a pigment having attached at least one organic group. The organic group comprises at least one ionic group, ionizable group, or mixtures of an ionic group and an ionizable group. Preferably the organic group is directly attached to the pigment. An ionic group is either anionic or cationic and is associated with a counterion of the opposite charge including inorganic or organic counterions such as $Na^+$, $K^+$, $Li^+$, $NH_4^+$, $NR'_4^+$, acetate, $NO_3^-$, $SO_4^{-2}$, $R'SO_3^-$, $R'OSO_3^-$, $OH^-$, and $Cl^-$, where R' represents hydrogen or an organic group such as a substituted or unsubstituted aryl and/or alkyl group. An ionizable group is one that is capable of forming an ionic group in the medium of use. Anionizable groups form anions and cationizable groups form cations. Examples of organic ionic and ionizable groups include those described in U.S. Pat. No. 5,698,016, the description of which is fully incorporated herein by reference.

Anionic groups are negatively charged ionic groups that may be generated from groups having ionizable substituents that can form anions (anionizable groups), such as acidic substituents. They may also be the anion in the salts of ionizable substituents. Representative examples of anionic groups include $—COO^-$, $—SO_3^-$, $—OSO_3^-$, $—HPO_3^-$, $—OPO_3^{-2}$, and $—PO_3^{-2}$. Representative examples of anionizable groups include $—COOH$, $—SO_3H$, $—PO_3H_2$, $—R'SH$, $—R'OH$, and $—SO_2NHCOR'$, where R' represents hydrogen or an organic group such as a substituted or unsubstituted aryl and/or alkyl group. Preferably, the modified pigment comprises a pigment having attached at least one organic group which comprises at least one carboxylic acid group, sulfonic acid group, sulfate group, such as an alkylsulfate group, phosphonic acid group, phosphate group, or salts thereof. Preferred groups include arylcarboxylic acid group, arylsulfonic acid groups, or their salts.

Cationic groups are positively charged ionic groups that may be generated from ionizable substituents that can form cations (cationizable groups), such as protonated amines. For example, alkyl or aryl amines may be protonated in acidic media to form ammonium groups $—NR'_2H^+$, where R' represent an organic group such as a substituted or unsubstituted aryl and/or alkyl group. Cationic groups may also be positively charged organic ionic groups. Examples include quaternary ammonium groups ($—NR'_3^+$) and quaternary phosphonium groups ($—PR'_3^+$). Here, R' represents hydrogen or an organic group such as a substituted or unsubstituted aryl and/or alkyl group. Preferably, the modified pigment comprises a pigment having attached at least one ammonium group.

The method of the present invention comprises the step of treating the aqueous modified pigment dispersion with at least one oxidizing agent to form an oxidized modified pigment (that is, a modified pigment that has been oxidized). Any oxidizing agent known in the art may be used, but it is preferred that the oxidizing agent be at least partially soluble in the aqueous vehicle of the aqueous modified pigment dispersion. Examples of preferred oxidizing agents or oxidants include oxygen gas, ozone, peroxides such as hydrogen peroxide, persulfates, including sodium and potassium persulfate, hypohalites such a sodium hypochlorite, and oxidizing acids such a nitric acid. In addition, transition metal containing oxidants, such as permanganate salts, osmium tetroxide, chromium oxides, or ceric ammonium nitrate, may be used. Preferably, the oxidizing agent is ozone. Mixtures of oxidants may also be used, particularly mixtures of gaseous oxidants such as oxygen and ozone. Other oxidants will be known and are available to one skilled in the art.

The aqueous modified pigment dispersion may be treated with the oxidizing agent using any method known in the art and can be carried out in any suitable reactor or container. For example, ozone may be produced by an ozone generator and bubbled through the aqueous modified pigment dispersion for a time sufficient to produce an oxidized modified pigment. In addition, a variety of reaction conditions such as reaction time, reactor size, and temperature can be used depending on the type of oxidizing agent. For example, oxidizing agents that are not completely soluble in the aqueous vehicle of the aqueous modified pigment dispersion may require a different reactor size and reaction conditions compared to soluble oxidants in order to produce a concentration of oxidizing agent in solution sufficient to produce an oxidized modified pigment. In general, the step of treating the aqueous modified pigment dispersion with at least one oxidizing agent can be performed at temperatures ranging between 0° C. and 100° C., such as 10° C. to 50° C., including room temperature, and for a reaction time of 5 minutes to 24 hours, preferably 1 hour to 16 hours, more preferably 2 hours to 10 hours.

While a variety of reaction conditions may be used, it is preferred that the aqueous modified pigment dispersion is treated with an oxidizing agent under conditions in which the resulting oxidized modified pigment is also in dispersion form. This can be accomplished without the use of high shear conditions, which is often needed for prior methods in order to force an oxidized modified pigment into dispersion.

In general, treatment of a pigment, especially carbonaceous pigments, with an oxidizing agent is known to produce acidic species, especially acidic surface groups. Therefore, a change in the pH of the modified pigment dispersion is expected upon oxidation. A decrease in pH may result in a destabilization of the modified pigment dispersion during the oxidation treatment and may also result in an increase in viscosity. Furthermore, the resulting oxidized modified pigment may also be difficult to disperse under these conditions.

Therefore, it is preferred that the pH of either the aqueous modified pigment dispersion, or the resulting oxidized modified pigment, be adjusted in order to produce an aqueous oxidized modified pigment dispersion. The pH may be adjusted either before, during, or after the treatment with the oxidizing agent, in order to form an aqueous oxidized modified pigment dispersion. The pH may be adjusted by any method known in the art, including, for example, by the addition of a base. Any water soluble base can be used, including, for example, hydroxide salts such as sodium hydroxide or potassium hydroxide. Hydroxide base is particularly useful since it is stable to the oxidation conditions and therefore can be added prior to as well as after treatment with the oxidizing agent and the formation of the oxidized modified pigment. Water soluble amines may also be used, but these should be added after the treatment is completed due to their reactivity with oxidizing agents.

Thus, in one embodiment, the method of the present invention further comprises the step of adding base to the oxidized modified pigment to form an aqueous oxidized modified pigment dispersion. For this embodiment, the pH is adjusted after treatment with the oxidizing agent. The amount of base added will differ depending on a variety of factors, including, but not limited to, the type of ionic or ionizable group attached to the modified pigment that has been oxidized, the starting pH of the aqueous modified pigment dispersion, and the extent of oxidation. In any case, the amount of base added is an amount sufficient to raise the pH of the resulting oxidized modified pigment and thereby form an aqueous oxidized modified pigment dispersion. For this embodiment, it is preferred that an amount of base is added to the resulting oxidized modified pigment sufficient to raise the pH to greater than or equal to 6, more preferably greater than or equal to 7, and most preferably greater than or equal to 8.

In another embodiment, the method of the present invention further comprises the step of adding base to the aqueous modified pigment dispersion. Thus, for this embodiment, the pH is adjusted prior to treatment with the oxidizing agent. The amount of base added will be sufficient to compensate for the formation of any acidic species during the oxidation, which will lower the pH. As discussed above, the amount of base added will depend on the type of attached ionic or ionizable group of the modified pigment. Preferably, the amount of base added is sufficient to raise the pH of the starting aqueous modified pigment dispersion to greater than or equal to 8.5, preferably greater than or equal to 10, more preferably greater than or equal to 11, and most preferably greater than or equal to 12. In any case, the amount of base added should be in an amount sufficient to form an aqueous oxidized modified pigment dispersion having a pH of greater than or equal to 6, more preferably greater than or equal to 7, and most preferably greater than or equal to 8.

In another embodiment, the method of the present invention further comprises the step of adding base throughout the treatment of the aqueous modified pigment dispersion with the oxidizing agent. Thus, the pH of the starting dispersion is maintained throughout the treatment step. This may be done by either continuous or staged additions of base. For this embodiment, the pH is not allowed to drop below a specific level during the oxidation treatment. As discussed above, the specific pH will differ depending on a variety of factors. In any case, the amount of base added to maintain the pH above a desired value should be sufficient to maintain a dispersion of pigment throughout the oxidation step and result in the formation of an aqueous oxidized modified pigment dispersion. Preferably, an amount of base is added to maintain a pH of greater than or equal to 6, more preferably greater than or equal to 7, and most preferably greater than or equal to 8 throughout the oxidation treatment step.

As discussed above, the method of the present invention is a method of producing an oxidized modified pigment by treatment of an aqueous modified pigment dispersion with an oxidizing agent. Previously, oxidized pigments have been prepared by treatment of a pigment, such as carbon black, with an oxidizing agent. This treatment is used to modify the surface of the pigment and introduce various oxygen-containing surface groups, including carboxylic acids and salts thereof, anhydrides, esters or lactones, ketones, aldehydes, benzoquinones, alcohols, and phenols. However, the aqueous modified pigment dispersions used in the method of the present invention comprise a pigment which already has attached at least one organic group comprising at least one ionic group, ionizable group, or mixtures thereof. These pigments form stable aqueous dispersions without the need of conventional milling processes or additional dispersants due to the presence of the attached groups. Therefore, no treatment of these modified pigments would be needed to produce stable dispersions. In fact, it would be expected that the attached groups of the modified pigments described above would either interfere with or react with an oxidizing agent. Substantial loss of the attached groups would be expected, which would result in a subsequent loss of dispersion stability. However, it has surprisingly been found that the aqueous modified pigment dispersions described above can be treated with an oxidizing agent to produce an oxidized modified pigment that can be used to form a stable dispersion as well as an inkjet ink composition with improved overall properties.

Thus, the present invention further relates to an oxidized modified pigment which comprises the reaction product of a modified pigment and an oxidizing agent. Preferably the modified pigment is in the form of an aqueous dispersion. The modified pigment and oxidizing agent can be any of those described above. Any method of combining these reagents can be used, but preferably the method is the method described above. Preferably the method comprises the step of adding base either before, during, or after treatment with the oxidizing agent. Preferred pH's are as discussed above.

Furthermore, the present invention relates to an aqueous inkjet ink composition comprising the oxidized modified pigment described above. The inkjet ink composition may further comprise an aqueous vehicle, which can be the same or different than the aqueous vehicle of the aqueous modified pigment dispersion. The oxidized modified pigment is present in an amount effective to provide desirable image quality (for example, optical density) without detrimentally affecting the performance of the inkjet ink. For example, typically, the oxidized modified pigment will be present in an amount ranging from about 0.1% to about 20% based on the weight of the inkjet ink composition.

The aqueous inkjet ink compositions of the present invention can be formed with a minimum of additional components (additives and/or cosolvents) and processing steps. However, suitable additives may also be incorporated into these inkjet ink compositions to impart a number of desired properties while maintaining the stability of the compositions. For example, surfactants may be added to further enhance the colloidal stability of the composition. Other additives are well known in the art and include humectants, biocides, binders, drying accelerators, penetrants, and the like. The amount of a particular additive will vary depending on a variety of factors but are generally present in an amount ranging between 0% and 40% based on the weight of the inkjet ink composition. Additionally, the inkjet ink compositions of the present invention may further incorporate dyes to modify color balance and adjust optical density. Such dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, lithium salts, and the like. It is also within the bounds of the present invention to use a mixture of the oxidized modified pigments described herein and unmodified pigments, other modified pigments, or both.

The aqueous inkjet ink compositions can be purified and/or classified using any method known in the art. An optional counterion exchange step can also be used. In this way, unwanted impurities or undesirable large particles can be removed to produce an ink with good overall properties.

The present invention will be further clarified by the following examples which are intended to be only exemplary in nature.

EXAMPLES

Example 1-9

Preparation of an Oxidized Modified Pigment

Examples 1-9 describe the preparation of an oxidized modified pigment of the present invention. For each example, an aqueous modified pigment dispersion was treated with ozone in a reaction vessel equipped with an inlet to introduce ozone and an outlet to pass unreacted ozone to an ozone destructor. Ozone was generated by corona discharge from a source of oxygen using an ozone generator available from ClearWater Tech, LLC (model number of CD2000-P). The concentration of ozone that was generated was 5% (v/v) in oxygen and the flow rate was approximately 1 L/min. These were kept constant in all of the examples. The ozone was then passed through an In-USA Model H1 high concentration process ozone analyzer to monitor the concentration of ozone during the treatment and finally bubbled into a suitable reaction vessel containing the aqueous modified pigment dispersion using a stainless steel diffuser. For scales of 1 liter or less, a 1 liter HPLC bottle equipped with an overhead mechanical stirrer was used while, for scales between 1 liter and 2 liters, a 2 liter round bottom flask equipped with a magnetic stirrer was used. Unreacted ozone was destroyed by passing the flow of gas out of the reaction vessel into a pressure equalizing vessel and through a catalytic destructor using a vacuum pump. The pressure-equalizing vessel was used to keep the reaction vessel at atmospheric pressure. Air was allowed to flow into the pressure-equalizing vessel as makeup to prevent a negative pressure build up in the reaction vessel from the vacuum pump.

For each of these examples, $Na^+$ concentration was measured using an ion selective electrode (Thermo Orion Sureflow Ross sodium probe, calibrated for solutions containing 20 ppm to 6000 ppm sodium ions). Alternatively, $Na^+$ concentration could also be determined by combustion analysis, with comparable results. Titratable levels, in mmoles of titrable groups/g of pigment, were measured by titration using a Titrino 736 auto-titration machine in the pH range of 4 to 10. % Sulfur levels were determined by combustion analysis and reported as a percentage based of the weight of dry pigment. Particle size was determined using a Microtrac® Particle Size Analyzer, and the values reported are the mean volume particle size (mV).

The total surface area of a pigment measured by the BET method is the sum of its internal surface area (from pores) and its external surface. Thus, two pigments may have the same particle size yet may have very different BET surface areas due to their porosity. The t-area (also known as the statistical thickness surface area, or STSA) is a measure of only the external surface area of a pigment and is calculated by subtracting the porosity value from the BET value. As a result, the t-area of a pigment is always less than the BET value. For the following example, these values were measured following ASTM procedure D-6556-02a.

For examples in which commercially available aqueous modified pigment dispersion were not used, the dispersions were prepared by treating a pigment with the specified treating agent having a diazotizable group and sodium nitrite under conditions similar to that described in, for example, U.S. Pat. Nos. 5,922,118, 5,803,959, and 5,707,432.

Examples 1-3

Examples 1-3 describe the preparation of an oxidized modified pigment and resulting aqueous dispersions by treatment of an aqueous modified pigment having attached sulfonic acid salt groups with ozone. Examples 1-2 describe an embodiment of the method of the present invention in which base is added after the treatment with the oxidizing agent while Example 3 describes an embodiment in which base is added prior to the oxidation treatment.

Example 1

300 mL of a 16% aqueous dispersion of Cab-O-Jet® 200 colored pigment dispersion (an aqueous dispersion of a modified carbon black pigment having attached $SO_3Na$ groups commercially available from Cabot Corporation) was placed into the reaction vessel of the treatment set-up described above. Properties of this modified pigment are shown in Table 1 below. The dispersion, having a pH of 6.5, was stirred magnetically at room temperature while ozone-carrying oxygen was bubbled into the reaction vessel through the stainless-steel diffuser. The treatment was allowed to continue for 4 hours at room temperature. The resulting mixture had a pH of 2.5 and comprised an oxidized modified carbon black pigment of the present invention. To this mixture was added 20 mL of a 2M NaOH solution with stirring, which resulted in the formation of an aqueous oxidized modified pigment dispersion. The dispersion was diafiltered using a Spectrum Minikros tangential flow separation module (medial rating of 0.05 m) with 10 volumes of DI water and concentrated to give an aqueous oxidized modified pigment dispersion (15% solids) having a particle size of 119 nm and a pH of 7.4. Properties of the oxidized modified pigment in the dispersion are shown in Table 1 below.

TABLE 1

|  | Modified Pigment | Oxidized Modified Pigment |
|---|---|---|
| % sulfur | 2.08 | 1.37 |
| $Na^+$ concentration | 9649 ppm | 9996 ppm |
| titratable level | n.a.* | 0.10 mmoles/g |

*titratable levels for the modified pigment were not measured since sulfonic acid groups would not be titrated in the pH range studied As these results show, the oxidized modified pigment has a lower level of sulfur compared to the starting modified pigment, indicating some loss in attached sulfonic acid salt groups. However, surprisingly a substantial amount of the initial sulfonic acid groups remained after treatment. In addition, the sodium ion concentration is slightly higher than the starting dispersion, indicating the presence of acidic functional groups resulting from the oxidation treatment, in addition to the remaining sulfonic acid groups. Titration results show a titratable level consistent with this increase in acidic functional groups.

The resulting aqueous oxidized modified pigment dispersion was found to be a stable dispersion. The particle size of this dispersion is small enough that this could be used as an inkjet ink composition.

Example 2

400 mL of a 14% aqueous dispersion of a modified pigment, prepared by the treatment of Black Pearls® 700 carbon black with 0.3 mmoles of sulfanilic acid per gram of carbon black, was placed into the reaction vessel of the treatment set-up described above. Properties of this modified pigment are shown in Table 2 below. The dispersion, having a pH of 8.1, was stirred magnetically at room temperature while ozone-carrying oxygen was bubbled into the reaction vessel through the stainless-steel diffuser. The treatment was allowed to continue for 4 hours at room temperature. The resulting mixture had a pH of 2.2 and comprised an oxidized modified carbon black pigment of the present invention. To this mixture was added 20 mL of a 2M NaOH solution with stirring, which resulted in the formation of an aqueous oxidized modified pigment dispersion. The dispersion was diafiltered using a Spectrum Minikros tangential flow separation module (medial rating of 0.05 m) with 10 volumes of DI water and concentrated to give an aqueous oxidized modified pigment dispersion (15% solids) having a particle size of 160 nm and a pH of 7.5. Properties of the oxidized modified pigment in the dispersion are shown in Table 2 below.

TABLE 2

|  | Modified Pigment | Oxidized Modified Pigment |
| --- | --- | --- |
| % sulfur | 1.20 | 0.80 |
| $Na^+$ concentration | 3895 ppm | 8472 ppm |
| titratable level | n.a.* | 0.14 mmoles/g |

*titratable levels for the modified pigment were not measured since sulfonic acid groups would not be titrated in the pH range studied As these results show, the oxidized modified pigment has a lower level of sulfur compared to the starting modified pigment, indicating some loss in attached sulfonic acid salt groups. However, surprisingly a substantial amount of the initial sulfonic acid groups remained after treatment. In addition, the sodium ion concentration is considerably higher than the starting dispersion, indicating the presence of acidic functional groups resulting from the oxidation treatment, in addition to the remaining sulfonic acid groups. Titration results show a titratable level consistent with this increase in acidic functional groups.

The resulting aqueous oxidized modified pigment dispersion was found to be a stable dispersion. The particle size of this dispersion is small enough that this could be used as an inkjet ink composition.

Example 3

600 mL of a 10% aqueous dispersion of a modified pigment, prepared by the treatment of Black Pearls® 700 carbon black with 0.2 mmoles of sulfanilic acid per gram of carbon black, was placed into the reaction vessel of the treatment set-up described above. Properties of this modified pigment are shown in Table 3 below. To this dispersion, which had a pH of 7.2, was added 20 mL of a 2M NaOH solution, with stirring. The pH increased to 12.1. The dispersion was then stirred magnetically at room temperature while ozone-carrying oxygen was bubbled into the reaction vessel through the stainless-steel diffuser. The treatment was allowed to continue for 4 hours at room temperature, resulting in the formation of an aqueous oxidized modified pigment dispersion. The dispersion was diafiltered using a Spectrum Minikros tangential flow separation module (medial rating of 0.05 m) with 10 volumes of DI water and concentrated to give an aqueous oxidized modified pigment dispersion (15% solids) having a particle size of 156 nm and a pH of 7.3. Properties of the oxidized modified pigment in the dispersion are shown in Table 3 below.

TABLE 3

|  | Modified Pigment | Oxidized Modified Pigment |
| --- | --- | --- |
| % sulfur | 1.05 | 0.72 |
| $Na^+$ concentration | 2344 ppm | 6519 ppm |
| titratable level | n.a.* | 0.17 mmoles/g |

*titratable levels for the modified pigment were not measured since sulfonic acid groups would not be titrated in the pH range studied As these results show, the oxidized modified pigment has a lower level of sulfur compared to the starting modified pigment, indicating some loss in attached sulfonic acid salt groups. However, surprisingly a substantial amount of the initial sulfonic acid groups remained after treatment. In addition, the sodium ion concentration is considerably higher than the starting dispersion, indicating the presence of acidic functional groups resulting from the oxidation treatment, in addition to the remaining sulfonic acid groups. Titration results show a titratable level consistent with this increase in acidic functional groups.

The resulting aqueous oxidized modified pigment dispersion was found to be a stable dispersion. The particle size of this dispersion is small enough that this could be used as an inkjet ink composition.

Examples 4-6

Examples 4-6 describe the preparation of an oxidized modified pigment and resulting aqueous dispersions by treatment of an aqueous modified pigment having attached carboxylic acid salt groups with ozone. Examples 4 describes an embodiment of the method of the present invention in which base is added prior to the treatment with the oxidizing agent, Example 5 describes an embodiment in which base is added both at the beginning and during the oxidation treatment, and Example 6 describes an embodiment in which base is added after the oxidation treatment.

Example 4

300 mL of a 16% aqueous dispersion of Cab-O-Jet® 300 colored pigment dispersion (an aqueous dispersion of a modified carbon black pigment having attached $CO_2Na$ groups commercially available from Cabot Corporation) was placed into the reaction vessel of the treatment set-up described above. Properties of this modified pigment are shown in Table 4 below. To this dispersion, which had a pH of 7.5, was added 20 mL of a 2M NaOH solution, with stirring. The pH increased to 12.8. The dispersion was then stirred magnetically at room temperature while ozone-carrying oxygen was bubbled into the reaction vessel through the stainless-steel diffuser. The treatment was allowed to continue for 4 hours at room temperature, resulting in the formation of an aqueous oxidized modified pigment dispersion. The dispersion was diafiltered using a Spectrum Minikros tangential flow separation module (medial rating of 0.05 m) with 10 volumes of DI water and concentrated to give an aqueous oxidized modified pigment dispersion (15% solids) having a particle size of 143 nm and a pH of 7.2. Properties of the oxidized modified pigment in the dispersion are shown in Table 4 below.

TABLE 4

|  | Modified Pigment | Oxidized Modified Pigment |
| --- | --- | --- |
| $Na^+$ concentration | 5003 ppm | 6366 ppm |
| titratable level | 0.30 mmoles/g | 0.13 mmoles/g |

As these results show, the oxidized modified pigment has a lower level of titratable groups yet has an increase in the sodium ion concentration. This indicates the presence of acidic functional groups resulting from the oxidation treatment, in addition to remaining carboxylic acid salt groups from the starting modified pigment.

The BET surface area and t-area were measured to be 147.1 $m^2/g$ and 136.8 $m^2/g$ respectively, and the micropore volume was determined to be 0.004599 cc/g. Therefore, contrary to prior art methods, the oxidation treatment of modified carbon products does not significantly increase the surface area of the pigment nor does it increase the microporosity.

The resulting aqueous oxidized modified pigment dispersion was found to be a stable dispersion. The particle size of this dispersion is small enough that this could be used as an inkjet ink composition.

Example 5

1.8 L of a 15% aqueous dispersion of Cab-O-Jet® 300 colored pigment dispersion (an aqueous dispersion of a modified carbon black pigment having attached $CO_2Na$ groups commercially available from Cabot Corporation) was placed into the reaction vessel of the treatment set-up described above. Properties of this modified pigment are shown in Table 5 below. To this dispersion, which had a pH of 7.6, was added 20 mL of a 2M NaOH solution, with stirring. The pH increased to 12.1. The dispersion was then stirred with an overhead stirrer at room temperature while ozone-carrying oxygen was bubbled into the reaction vessel through the stainless-steel diffuser. The treatment was allowed to continue for 6 hours at room temperature, and during this time (after 3 hours) another 20 mL of a 2M NaOH solution was added. This resulted in the formation of an aqueous oxidized modified pigment dispersion. The dispersion was diafiltered using a Spectrum Minikros tangential flow separation module (medial rating of 0.05 m) with 10 volumes of DI water and concentrated to give an aqueous oxidized modified pigment dispersion (15% solids) having a particle size of 135 nm and a pH of 6.9. Properties of the oxidized modified pigment in the dispersion are shown in Table 5 below.

TABLE 5

| | Modified Pigment | Oxidized Modified Pigment |
|---|---|---|
| $Na^+$ concentration | 5486 ppm | 7374 ppm |
| titratable level | 0.30 mmoles/g | 0.21 mmoles/g |

As these results show, the oxidized modified pigment has a lower level of titratable groups yet has an increase in the sodium ion concentration. This indicates the presence of acidic functional groups resulting from the oxidation treatment, in addition to remaining carboxylic acid salt groups from the starting modified pigment.

The BET surface area and t-area were measured to be 139.9 $m^2/g$ and 129.4 $m^2/g$ respectively, and the micropore volume was determined to be 0.003685 cc/g. Therefore, contrary to prior art methods, the oxidation treatment of modified carbon products does not significantly increase the surface area of the pigment nor does it increase the microporosity.

The resulting aqueous oxidized modified pigment dispersion was found to be a stable dispersion. The particle size of this dispersion is small enough that this could be used as an inkjet ink composition.

Example 6

300 mL of a 15% aqueous dispersion of Cab-O-Jet® 300 colored pigment dispersion (an aqueous dispersion of a modified carbon black pigment having attached $CO_2Na$ groups commercially available from Cabot Corporation) was placed into the reaction vessel of the treatment set-up described above. Properties of this modified pigment are shown in Table 6 below. The dispersion, having a pH of 7.6, was stirred magnetically at room temperature while ozone-carrying oxygen was bubbled into the reaction vessel through the stainless-steel diffuser. The treatment was allowed to continue for 4 hours at room temperature. Just prior to the completion of the treatment (after 3.5 hours), 20 mL of a 2M NaOH solution was added, with stirring, resulting in the formation of an aqueous oxidized modified pigment dispersion. The dispersion was diafiltered using a Spectrum Minikros tangential flow separation module (medial rating of 0.05 m) with 10 volumes of DI water and concentrated to give an aqueous oxidized modified pigment dispersion (15% solids) having a particle size of 152 nm and a pH of 7.4. Properties of the oxidized modified pigment in the dispersion are shown in Table 6 below.

TABLE 6

| | Modified Pigment | Oxidized Modified Pigment |
|---|---|---|
| $Na^+$ concentration | 5486 ppm | 7400 ppm |
| titratable level | 0.30 mmoles/g | 0.14 mmoles/g |

As these results show, the oxidized modified pigment has a lower level of titratable groups yet has an increase in the sodium ion concentration. This indicates the presence of acidic functional groups resulting from the oxidation treatment, in addition to remaining carboxylic acid salt groups from the starting modified pigment.

The BET surface area and t-area were measured to be 144.5 $m^2/g$ and 134.1 $m^2/g$ respectively, and the micropore volume was determined to be 0.004758 cc/g. Therefore, contrary to prior art methods, the oxidation treatment of modified carbon products does not significantly increase the surface area of the pigment nor does it increase the microporosity.

The resulting aqueous oxidized modified pigment dispersion was found to be a stable dispersion. The particle size of this dispersion is small enough that this could be used as an inkjet ink composition.

Examples 7-9

Examples 7-9 describe the preparation of an oxidized modified pigment and resulting aqueous dispersions by treatment of an aqueous modified pigment having different attached carboxylic acid salt groups with ozone.

Example 7

500 mL of a 15% aqueous dispersion of a modified pigment, prepared by the treatment of Black Pearls® 700 carbon black with 0.4 mmoles of 5-amino-iso-phthalic acid per gram of carbon black, was placed into the reaction vessel of the treatment set-up described above. Properties of this modified pigment are shown in Table 7 below. The dispersion, having a pH of 8.1 was stirred magnetically at room temperature while ozone-carrying oxygen was bubbled into the reaction vessel through the stainless-steel diffuser. The treatment was allowed to continue for 4 hours at room temperature, and during this time (after 2 hours) 20 mL of a 2M NaOH solution was added. This resulted in the formation of an aqueous oxidized modified pigment dispersion. The dispersion was diafiltered using a Spectrum Minikros tangential flow separation module (medial rating of 0.05 m) with 10 volumes of DI water and concentrated to give an aqueous oxidized modified pigment dispersion (15% solids) having a particle size of 155 nm and a pH of 7.5. Properties of the oxidized modified pigment in the dispersion are shown in Table 7 below.

TABLE 7

|  | Modified Pigment | Oxidized Modified Pigment |
|---|---|---|
| Na$^+$ concentration | 7986 ppm | 7372 ppm |
| titratable level | 0.36 mmoles/g | 0.20 mmoles/g |

As these results show, the oxidized modified pigment has a lower level of titratable groups yet has a similar sodium ion concentration. This indicates the presence of acidic functional groups resulting from the oxidation treatment, in addition to remaining carboxylic acid salt groups from the starting modified pigment.

The resulting aqueous oxidized modified pigment dispersion was found to be a stable dispersion. The particle size of this dispersion is small enough that this could be used as an inkjet ink composition.

Example 8

500 mL of a 16% aqueous dispersion of a modified pigment, prepared by the treatment of Black Pearls® 700 carbon black with 0.4 mmoles of 4-amino-phthalic acid per gram of carbon black, was placed into the reaction vessel of the treatment set-up described above. Properties of this modified pigment are shown in Table 8 below. To this dispersion, which had a pH of 8.7, was added 20 mL of a 2M NaOH solution, with stirring. The pH increased to 12.4. The dispersion was then stirred magnetically at room temperature while ozone-carrying oxygen was bubbled into the reaction vessel through the stainless-steel diffuser. The treatment was allowed to continue for 4 hours at room temperature, resulting in the formation of an aqueous oxidized modified pigment dispersion. The dispersion was diafiltered using a Spectrum Minikros tangential flow separation module (medial rating of 0.05 m) with 10 volumes of DI water and concentrated to give an aqueous oxidized modified pigment dispersion (15% solids) having a particle size of 145 nm and a pH of 8.5. Properties of the oxidized modified pigment in the dispersion are shown in Table 8 below.

TABLE 8

|  | Modified Pigment | Oxidized Modified Pigment |
|---|---|---|
| Na$^+$ concentration | 8962 ppm | 11840 ppm |
| titratable level | 0.30 mmoles/g | 0.24 mmoles/g |

As these results show, the oxidized modified pigment has a lower level of titratable groups yet has an increase in the sodium ion concentration. This indicates the presence of acidic functional groups resulting from the oxidation treatment, in addition to remaining carboxylic acid salt groups from the starting modified pigment.

The resulting aqueous oxidized modified pigment dispersion was found to be a stable dispersion. The particle size of this dispersion is small enough that this could be used as an inkjet ink composition.

Example 9

500 mL of a 15% aqueous dispersion of a modified pigment, prepared by the treatment of Black Pearls® 700 carbon black with 0.4 mmoles of 5-aminobenzene-1,2,3-tricarboxylic acid per gram of carbon black, was placed into the reaction vessel of the treatment set-up described above. Properties of this modified pigment are shown in Table 9 below. To this dispersion, which had a pH of 8.7, was added 20 mL of a 2M NaOH solution, with stirring. The pH increased to 10.5. The dispersion was then stirred magnetically at room temperature while ozone-carrying oxygen was bubbled into the reaction vessel through the stainless-steel diffuser. The treatment was allowed to continue for 4 hours at room temperature, resulting in the formation of an aqueous oxidized modified pigment dispersion. The dispersion was diafiltered using a Spectrum Minikros tangential flow separation module (medial rating of 0.05 m) with 10 volumes of DI water and concentrated to give an aqueous oxidized modified pigment dispersion (15% solids) having a particle size of 177 nm and a pH of 8.2. Properties of the oxidized modified pigment in the dispersion are shown in Table 9 below.

TABLE 9

|  | Modified Pigment | Oxidized Modified Pigment |
|---|---|---|
| Na$^+$ concentration | 9151 ppm | 7943 ppm |
| titratable level | 0.37 mmoles/g | 0.21 mmoles/g |

As these results show, the oxidized modified pigment has a lower level of titratable groups yet and a decrease in the sodium ion concentration. This indicates the presence of acidic functional groups resulting from the oxidation treatment. In addition, remaining tricarboxylic acid groups may also be present, but at a lower level than the starting modified pigment.

The resulting aqueous oxidized modified pigment dispersion was found to be a stable dispersion. The particle size of this dispersion is small enough that this could be used as an inkjet ink composition.

Comparative Examples 1 and 2

Preparation of an Modified Oxidized Pigment

Comparative Examples 1 and 2 describe the preparation of a pigment by modification of an oxidized pigment. In effect, these examples describe a material produced in which the oxidation and modification steps are reversed compared to those of the present invention. In Comparative Example 1, the oxidized pigment used in the modification step is prepared using a procedure similar to that described in Examples 1-9 above. Also, for both Comparative Examples 1 and 2, the modified oxidized pigment is prepared by treating an oxidized pigment with the specified treating agent using the procedures described in Examples 1-9 above.

Comparative Example 1

In a 2 liter round bottom flask equipped with a overhead high shear mixer (a Tempest Virtishear homogenizer), 150 g of Monarch® 700 carbon black was mixed with 1.5 liters of DI water for 1 hour prior. Ozone-carrying oxygen was bubbled into the mixture as described above for 1 hour. As the reaction progressed, the mixture was transformed into a slurry and then a viscous dispersion, having a pH of approximately 5.5. To this was added 20 mL of a 2M NaOH solution, which raised the pH to 12.4. The bubbling of ozone-carrying oxygen flow was continued for another 3 hours and then the reaction was stopped. This resulted in the formation of a dispserion of an oxidized pigment having a pH of approximately 10.4 and a bimodal particle size, with ~75% below 1 μm (mv=740 nm). Extensive sonication with a sonic probe failed to produce a dispersion having a particle size in the 100-200 nm range.

The oxidized pigment dispersion was further treated with 0.8 mmoles of p-amino benzoic acid per gram of black, resulting in the formation of a modified oxidized carbon black dispersion. The dispersion was diafiltered using a Spectrum Minikros tangential flow separation module (medial rating of 0.05 m) with 10 volumes of DI water and concentrated to give an aqueous modified oxidized pigment dispersion (11.5% solids) having a particle size of 150 nm and a pH of 8.2. The properties of the modified oxidized pigment in the dispersion are shown in Table 10 below, along with those of Examples 4-6.

TABLE 10

|  | Ex 4 | Ex 5 | Ex 6 | Comp Ex 1 |
|---|---|---|---|---|
| pH | 7.2 | 6.9 | 7.4 | 8.2 |
| particle size | 143 | 35 | 152 | 150 |
| Na+ conc | 6366 ppm | 7374 ppm | 7400 | 8107 ppm |
| titratable level | 0.13 mmoles/g | 0.21 mmoles/g | 0.14 mmoles/g | 0.45 mmoles/g |
| BET | 147.1 m$^2$/g | 139.9 m$^2$/g | 144.5 m$^2$/g | 128.9 m$^2$/g |
| t-area | 136.8 m$^2$/g | 129.4 m$^2$/g | 134.1 m$^2$/g | 111.8 m$^2$/g |
| micropore vol | 0.004599 cc/g | 0.003685 cc/g | 0.004758 cc/g | 0.007026 cc/g |

As the data in Table 10 shows, the pigment dispersion prepared by first oxidation and then modification is very different from that prepared using the method of the present invention. In particular, both the sodium ion concentration and the titratable level of Comparative Example 1 is much higher than those of Examples 4-6, indicating the presence of substantially more attached groups even though the same level of p-amino benzoic acid groups was used. Also, even though more groups are present, the resulting particle size is similar. Additionally, the product of Comparative Example 1 has a lower surface area and a much higher micropore volume than those of Example 4-6, indicating a substantial degradation of the carbon black surface. Therefore, the product of the present invention (as exemplified by Examples 4-6) are not the same as those of Comparative Example 1, prepared using a procedure in which the oxidation and modification steps are reversed.

Comparative Example 2

An aqueous dispersion of a modified pigment was prepared by the treatment of Ravens 3500 carbon black (a oxidized carbon black commercially available from Columbia Chemical Company) with 0.8 mmoles of p-amino benzoic acid per gram of carbon black. After treatment, the pH of the resulting dispersion was adjusted to 7-8 with a 1M NaOH solution, and the dispersion was purified by diafiltration.

The resulting 16.2% solids aqueous modified oxidized pigment dispersion was found to have a pH of 7.49 and a sodium ion concentration of 8963 ppm. This is considerably higher than the sodium ion concentrations of Examples 4-6, even though the same level of p-amino benzoic acid groups was used. In addition, the particle size of the modified oxidized pigment of Comparative Example 2 was found to be 125 nm, but this dispersion could not be filtered through a 20 micron Pall filter. Therefore, this dispersion of Comparative Example 2 could not be used as an inkjet ink composition. Thus, the product of Comparative Example 2, prepared by modification of an oxidized carbon black, is not the same as those of Examples 4-6, prepared by the oxidation of a modified carbon black.

Examples 10-11

Print Performance

Examples 10 and 11 describe the performance properties of inkjet inks of the present invention which comprise oxidized modified pigments described above.

Two formulations were used to prepare inkjet ink compositions. These are shown in Table 11 below.

TABLE 11

| Ingredient | Formulation 1 | Formulation 2 |
|---|---|---|
| 2-pyrrolidinone | 19.0% | 19.0% |
| 1,5-pentanediol | 2.7% | 1.7% |
| diethyleneglycol butyl ether | 1.0% | 3.0% |
| Surfynol 465 |  | 0.30% |
| water | 77.3% | 76.0% |

The targeted pigment level in all inks was 4.0%, taking into account the weight of the attached groups, which was determined by calculating the treatment level using the sodium ion concentration measured for the starting aqueous modified pigment dispersion. Formulation 1 is a less penetrating, higher surface tension formulation. The inks prepared with this formulation had an average surface tension of 52.3 dynes/cm (2.0 standard deviation) while the inks made with Formulation 2 had an average surface tension of 41.2 dynes/cm (1.3 standard deviation). Generally, inks can be expected to perform worse in print quality tests (particularly OD) as the surface tension goes down, but should do better for dry time and highlighter smear.

Performance testing was conducted by printing images with an HP Photosmart P1000 printer set for "Best" mode, "Grayscale" printing, "Black Only". All performance criteria were measured on the four types of plain paper: Great White Ink Jet (GWIJ), Hammermill Copy Plus (HCP), Hewlett Packard Bright White (HPBW), Xerox 4024 (X0424). Performance measurements are as follows:

OD—The optical density (or visual density) of a solid area filled at maximum print density measured with an XRite spectrodensitometer. Four measurements of OD were obtained on 3 replicate prints on each type of paper.

Gray Variance—This is an indication of mottle. An image of an approximately 3 cm by 2.2 cm region of a solid area filled at maximum print density was digitized at 640×480 pixels (about 45 microns per pixel). Each pixel was assigned a value from 0 to 255 which is proportional to the brightness of the image at that point. This value is called a gray level. The gray variance is the variance of the gray levels of all the pixels in the image. If the area is perfectly uniform, the variance is zero. The higher the variance, the less uniform the image is and the worse the mottle. One image was measured on 3 replicate prints for each type of paper.

Highlighter Smear—Two types of highlighter—an Avery Dennison Hi-Liter Fluorescent Marker series#24-OXX yellow and a Sanford Major Accent Fluorescent Highlighter orange—were used. A 0.5 inch wide black stripe (printed at 100% density) was printed and allowed to dry for 5 minutes. Then, two one inch strokes were taken across the image, one on top of the other. This was repeated 4 times for each type of highlighter. The highlighter tip was wiped on a paper towel after the second stroke until no black ink comes off the tip. As a control, 4 double strokes were taken on an unprinted area of the paper. The optical density of each double stroke set was measured with a Macbeth densitomer. The four test results were averaged, and the average of the 4 control results were then subtracted. This process was repeated with the other type of highlighter, and results for the 2 highlighters were averaged. One print was measured for each paper type.

Dry Time—A half inch black stripe like the one used for highlighter smear was printed. As it printed, a stop watch was started. A piece of cardboard having attached a piece of Hammermill Copy Plus paper on one side and an empty 20 mL glass vial on the other was placed on the printed stripe, paper side down (the weight of this was similar to that of a 500 sheet ream of standard plain office paper). After 3 seconds, it was removed and replaced by another on an adjacent unused spot on the stripe. This was continued until no ink was seen on the paper on the bottom of the vial, and the time was recorded as the dry time.

Water Fastness—The same half inch black stripe described above was printed. Five minutes after printing, the print was placed in a jig that held it at a fixed angle, and approximately one milliliter of deionized water was run across the black stripe. If any ink run-off was seen, the optical density of the smear was measured. The optical density of the paper itself was subtracted from this optical density to get a measure of water fastness. One print was measured for each paper type.

Example 10

Inkjet ink compositions of the present invention were prepared by combining the aqueous oxidized modified pigment dispersions of the examples above with the formulation shown in Table 10 above. Amounts used for each inkjet ink composition are shown in Table 12 below.

TABLE 12

| Example # | Aqueous Dispersion | | | Formulation | |
|---|---|---|---|---|---|
| | Example # | % Solids | Amount | Formulation # | Amount |
| 10-A1 | 1 | 10.42 | 10.38 | 1 | 25.01 |
| 10-A2 | 1 | 10.42 | 10.37 | 2 | 25.03 |
| 10-B1 | 2 | 11.65 | 8.85 | 1 | 25.02 |
| 10-B2 | 2 | 11.65 | 8.86 | 2 | 25.03 |
| 10-C1 | 3 | 11.23 | 9.06 | 1 | 25.02 |
| 10-C2 | 3 | 11.23 | 9.06 | 2 | 25.02 |
| 10-D1 | 4 | 10.70 | 9.67 | 1 | 25.06 |
| 10-D2 | 4 | 10.70 | 9.67 | 2 | 25.05 |
| 10-E | 6 | 14.06 | 7.35 | 2 | 25.01 |
| 10-F | 7 | 7.36 | 28.18 | 2 | 50.00 |
| 10-G | 8 | 8.26 | 25.26 | 2 | 50.02 |

In addition, comparative inkjet ink compositions were prepared by combining the starting aqueous modified pigment dispersions used to prepare the aqueous oxidized modified pigment dispersions shown above and the formulations shown in Table 11 above. Amounts used for each comparative inkjet ink composition are shown in Table 13 below.

Results from the print testing of each of these inkjet ink compositions is shown in Table 14 below. As the results show, inkjet ink compositions of the present invention comprising an oxidized modified pigment have higher optical density compared to those of the comparative inkjet ink compositions comprising the corresponding unoxidized modified pigments.

TABLE 13

| Comp. Example # | Aqueous Dispersion | | | Formulation | |
|---|---|---|---|---|---|
| | Example # | % Solids | Amount | Formulation # | Amount |
| Comp 10-A1 | 1 | 16.40 | 6.60 | 1 | 25.03 |
| Comp 10-A2 | 1 | 16.40 | 6.59 | 2 | 25.02 |
| Comp 10-B1 | 2 | 13.85 | 7.45 | 1 | 25.02 |
| Comp 10-B2 | 2 | 13.85 | 7.45 | 2 | 25.03 |
| Comp 10-C1 | 3 | 9.50 | 10.71 | 1 | 25.02 |
| Comp 10-C2 | 3 | 9.50 | 10.71 | 2 | 25.04 |
| Comp 10-D1 | 4 | 15.50 | 6.66 | 1 | 25.04 |
| Comp 10-D2 | 4 | 15.50 | 6.66 | 2 | 25.04 |
| Comp 10-E | 6 | 15.30 | 6.88 | 2 | 25.01 |
| Comp 10-F | 7 | 14.84 | 13.97 | 2 | 49.99 |
| Comp 10-G | 8 | 15.50 | 13.46 | 2 | 50.01 |

TABLE 14

| Ex # | OD | Gray Variance | Highlighter Smear | Dry time |
|---|---|---|---|---|
| 10-A1 | 1.257 | 106 | 0.33 | 43 sec |
| Comp 10-A1 | 1.192 | 157 | 0.33 | 42 sec |
| 10-A2 | 1.178 | 110 | 0.13 | 6 sec |
| Comp 10-A2 | 1.145 | 121 | 0.12 | 6 sec |
| 10-B1 | 1.446 | 22 | 0.44 | 70 sec |
| Comp 10-B1 | 1.198 | 169 | 0.30 | 42 sec |
| 10-B2 | 1.231 | 86 | 0.14 | 9 sec |
| Comp 10-B2 | 1.148 | 213 | 0.17 | 10 sec |
| 10-C1 | 1.433 | 33 | 0.42 | 68 sec |
| Comp 10-C1 | 1.423 | 25 | 0.45 | 69 sec |
| 10-C2 | 1.380 | 28 | 0.20 | 20 sec |
| Comp 10-C2 | 1.248 | 111 | 0.17 | 15 sec |
| 10-D1 | 1.411 | 44 | 0.38 | 62 sec |
| Comp 10-D1 | 1.332 | 66 | 0.39 | 65 sec |
| 10-D2 | 1.409 | 17 | 0.16 | 18 sec |
| Comp 10-D2 | 1.228 | 105 | 0.17 | 11 sec |
| 10-E | 1.412 | 26 | 0.30 | 14 sec |
| Comp 10-E | 1.264 | 90 | 0.27 | 10 sec |
| 10-F | 1.262 | 72 | 0.18 | 3 sec |
| Comp 10-F | 1.203 | 118 | 0.19 | 2 sec |
| 10-G | 1.322 | 40 | 0.24 | 6 sec |
| Comp 10-G | 1.297 | 57 | 0.20 | 3 sec |

As the results show, inkjet ink compositions of the present invention comprising an oxidized modified pigment have higher optical density compared to those of the comparative inkjet ink compositions comprising the corresponding non-oxidized modified pigments. In addition, generally all other performance properties either remain essentially unchanged or show slight improvements. Most notable is that the highlighter smear values do not change significantly. This is particularly important considering the increase in optical density. One would expect that, given the higher OD's, an increase in highlighter smear would result. Thus, the inkjet ink compositions of the present invention have an unexpected combination of performance properties, in two different types of inkjet ink formulations.

Example 11

The dispersion of Example 6 was combined with the various inkjet ink formulations shown in Table 15 below (amounts shown are percent of the total formulation.

TABLE 15**

| Formulation # | Gly | 2-P | IPA | 1,4-diol | 1,5-diol | SLP100 | 1,2-diol | water |
|---|---|---|---|---|---|---|---|---|
| 3 | 17 | | 3 | 6 | | | | 74 |
| 4 | 17 | | 3 | 6 | | 0.1 | | 73.9 |
| 5 | 17 | | 3 | 5 | | 0.1 | 1 | 73.9 |
| 6 | 17 | | 3 | 4 | | 0.1 | 2 | 73.9 |
| 7 | 17 | | 3 | 4 | | 0.3 | 3 | 72.7 |
| 8 | 17 | | 3 | | 6 | | | 74 |
| 9 | | 17 | 3 | 6 | | | | 74 |
| 10 | | 17 | 3 | 6 | | | | 74 |
| 11 | | 17 | 3 | 5 | | | 1 | 74 |
| 12 | | 17 | 3 | 6 | | 0.1 | | 73.9 |
| 13 | | 17 | 3 | 4 | | | 2 | 74 |
| 14 | | 17 | 3 | 5 | | 0.1 | 1 | 73.9 |
| 15 | | 17 | 3 | 4 | | 0.1 | 2 | 73.9 |
| 16 | | 17 | 3 | 4 | | | 3 | 73 |
| 17 | | 17 | 3 | 6 | | 0.3 | | 73.7 |
| 18 | | 17 | 3 | 4 | | 0.3 | 3 | 72.3 |
| 19 | | 17 | 3 | 6 | | 0.5 | | 73.5 |

**Gly = glycerol, 2-P = 2-pyrrolidone, IPA = iso-propanol, 1,4-diol = 1,4-butanediol, 1,5-diol = 1,5-pentanediol, SPL100 = Surfadone LP100, 1,2-diol - 1,2-hexanediol Amounts used for preparing each inkjet ink composition are shown in Table 16 below.

TABLE 16

| Example # | Formulation # | Surface Tension (dynes/cm) | Viscosity (cp) |
|---|---|---|---|
| 11-3 | 3 | 50.4 | 3.15 |
| 11-4 | 4 | 42.7 | 3.15 |
| 11-5 | 5 | 39.5 | 2.89 |
| 11-6 | 6 | 36.4 | 3.15 |
| 11-7 | 7 | 30.9 | 3.27 |
| 11-8 | 8 | 49.3 | 3.24 |
| 11-9 | 9 | 50.3 | 3.23 |
| 11-10 | 10 | 49.0 | 3.00 |
| 11-11 | 11 | 46.0 | 3.01 |
| 11-12 | 12 | 45.9 | 3.01 |
| 11-13 | 13 | 43.5 | 3.01 |
| 11-14 | 14 | 43.4 | 3.00 |
| 11-15 | 15 | 41.7 | 3.00 |
| 11-16 | 16 | 41.0 | 3.10 |
| 11-17 | 17 | 38.3 | 3.00 |
| 11-18 | 18 | 35.0 | 3.12 |
| 11-19 | 19 | 34.8 | 3.02 |

The performance properties of each inkjet ink composition are shown in Table 17. Also included in Table 17 are the measured properties for a commercially available HP45A print cartridge.

As the data shows, the inkjet ink compositions of the present invention have improved optical density over a commercially available inkjet ink formulation. Mottle is also improved. This example demonstrates the flexibility of the oxidized modified pigments of the present invention is a variety of different inkjet ink compositions.

TABLE 17

| Example # | OD | Mottle | Dry Time | Highlighter Smear |
|---|---|---|---|---|
| 11-3 | 1.434 | 85 | 53 sec | 0.58 |
| 11-4 | 1.467 | 32 | 39 sec | 0.50 |
| 11-5 | 1.424 | 48 | 18 sec | 0.44 |
| 11-6 | 1.450 | 14 | 13 sec | 0.28 |
| 11-7 | 1.358 | 28 | 3 sec | 0.17 |
| 11-8 | 1.477 | 24 | 44 sec | 0.67 |
| 11-9 | 1.481 | 18 | 33 sec | 0.63 |
| 11-10 | 1.469 | 18 | 32 sec | 0.54 |
| 11-11 | 1.452 | 24 | 40 sec | 0.44 |
| 11-12 | 1.455 | 20 | 26 sec | 0.45 |
| 11-13 | 1.441 | 16 | 27 sec | 0.39 |
| 11-14 | 1.454 | 12 | 20 sec | 0.37 |
| 11-15 | 1.387 | 27 | 17 sec | 0.28 |
| 11-16 | 1.383 | 28 | 14 sec | 0.26 |
| 11-17 | 1.404 | 22 | 10 sec | 0.23 |
| 11-18 | 1.306 | 43 | 1 sec | 0.18 |
| 11-19 | 1.336 | 35 | 3 sec | 0.21 |
| HP45A | 1.293 | 96 | 22 sec | 0.33 |

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of preparing an oxidized modified pigment comprising the steps of:
    a) forming an aqueous modified pigment dispersion comprising a modified pigment, wherein the modified pigment comprises a pigment having attached at least one organic group, and wherein the organic group comprises at least one ionic group, at least one ionizable group, or mixtures thereof, and
    b) treating the aqueous modified pigment dispersion with at least one oxidizing agent to form the oxidized modified pigment.

2. The method of claim 1, wherein the pigment comprises a blue pigment, a black pigment, a brown pigment, a cyan pigment, a green pigment, a white pigment, a violet pigment, a magenta pigment, a red pigment, a yellow pigment, or mixtures thereof.

3. The method of claim 1, wherein the pigment is carbon black.

4. The method of claim 1, wherein the organic group comprises at least one carboxylic acid group, sulfonic acid group, alkyl sulfate group, ammonium group, phosphonic acid group, phosphate group, or salts thereof.

5. The method of claim 1, wherein the organic group comprises at least one arylcarboxylic acid group, arylsulfonic acid group, or salts thereof.

6. The method of claim 1, wherein the oxidizing agent comprises ozone, a peroxide, a hypohalite, a persulfate, or nitric acid.

7. The method of claim 1, wherein the oxidizing agent is ozone.

8. The method of claim 1, further comprising the step of adding a base to the oxidized modified pigment to form an aqueous oxidized modified pigment dispersion.

9. The method of claim 8, wherein the base is added in an amount sufficient to form an aqueous oxidized modified pigment dispersion having a pH of greater than or equal to 6.

10. The method of claim 9, wherein the pH is greater than or equal to 8.

11. The method of claim 1, further comprising the step of adding a base to the aqueous modified pigment dispersion.

12. The method of claim 11, wherein the base is added in an amount sufficient to form an aqueous modified pigment dispersion having a pH of greater than or equal to 8.5.

13. The method of claim 12, wherein the pH is greater than or equal to 10.

14. The method of claim 12, wherein the pH is greater than or equal to 12.

15. The method of claim 11, wherein the base is added in an amount sufficient to form an aqueous oxidized modified pigment dispersion having a pH of greater than or equal to 6.

16. The method of claim 15, wherein the pH is greater than or equal to 8.

* * * * *